(12) United States Patent
Deng

(10) Patent No.: US 10,110,478 B2
(45) Date of Patent: Oct. 23, 2018

(54) METHOD AND DEVICE FOR DETERMINING IP FLOW ROUTING RULE

(71) Applicant: China Academy of Telecommunications Technology, Beijing (CN)

(72) Inventor: Qiang Deng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 72 days.

(21) Appl. No.: 15/304,865

(22) PCT Filed: Apr. 16, 2015

(86) PCT No.: PCT/CN2015/076771
§ 371 (c)(1),
(2) Date: Oct. 18, 2016

(87) PCT Pub. No.: WO2015/158285
PCT Pub. Date: Oct. 22, 2015

(65) Prior Publication Data
US 2017/0201453 A1    Jul. 13, 2017

(30) Foreign Application Priority Data
Apr. 18, 2014  (CN) .......................... 2014 1 0158951

(51) Int. Cl.
*H04L 12/721* (2013.01)
*H04L 12/707* (2013.01)
(Continued)

(52) U.S. Cl.
CPC .............. *H04L 45/38* (2013.01); *H04L 45/22* (2013.01); *H04W 40/00* (2013.01);
(Continued)

(58) Field of Classification Search
CPC .... H04L 45/22; H04L 45/38; H04W 36/0027; H04W 40/00; H04W 84/12; H04W 88/06
See application file for complete search history.

(56) References Cited

U.S. PATENT DOCUMENTS 9,894,556 B2 * 2/2018  Tomici .............. H04W 28/0268
2012/0324100 A1 * 12/2012 Tomici .................. H04L 45/123
709/224
(Continued)

FOREIGN PATENT DOCUMENTS

CN    101860492 A    10/2010
CN    102387063 A    3/2012
(Continued)

OTHER PUBLICATIONS

3GPP TS 24.303 V11.3.0, 3rd Generation Partnership Project; Technical Specification Group Core Network and Terminals; Mobility management based on Dual-Stack Mobile IPv6; Stage 3 (Release 11); in Jun. 2013; 9 pages.
(Continued)

*Primary Examiner* — Kashif Siddiqui
(74) *Attorney, Agent, or Firm* — Kilpatrick Townsend & Stockton LLP

(57) ABSTRACT

Disclosed are a method and device for determining an IP flow routing rule, wherein a technical solution of making an optimal routing rule through negotiation between a network device and a terminal is provided. The method comprises: when initiating an IFOM process, a first communication device generates a first routing rule that is different from a routing rule currently executed by a second communication device; the first communication device informs the second communication device of the first routing rule, and requests the second communication device to execute the first routing rule; and the first communication device determines, according to a message returned by the second communication
(Continued)

device, the routing rule that is eventually executed by the second communication device.

11 Claims, 6 Drawing Sheets

(51) Int. Cl.
  *H04W 40/00* (2009.01)
  *H04W 36/00* (2009.01)
  *H04W 88/06* (2009.01)
  *H04W 84/12* (2009.01)
(52) U.S. Cl.
  CPC ........ *H04W 36/0027* (2013.01); *H04W 84/12* (2013.01); *H04W 88/06* (2013.01)

(56) References Cited

U.S. PATENT DOCUMENTS

| | | | |
|---|---|---|---|
| 2013/0265879 | A1 | 10/2013 | Qiang |
| 2014/0161055 | A1* | 6/2014 | Chitrapu ............... H04W 48/18 370/329 |
| 2015/0319662 | A1* | 11/2015 | Enomoto .............. H04W 36/14 370/338 |

FOREIGN PATENT DOCUMENTS

| | | |
|---|---|---|
| CN | 102655665 A | 9/2012 |
| CN | 102958035 A | 3/2013 |
| CN | 103181237 A | 6/2013 |
| CN | 103582020 A | 2/2014 |
| JP | 2013524588 A | 6/2013 |
| WO | 2011120577 A1 | 10/2011 |
| WO | 2014015734 A1 | 1/2014 |

OTHER PUBLICATIONS

"3rd Generation Partnership Project; Technical Specification Group Services and System Aspects; Network based IP flow mobility (Release 12)", 3GPP Standard; 3GPP TR 23.861, 3rd Generation Partnership Project (3GPP), Mobile Competence Centre ; 650, Route Des Lucioles , F-06921 Sophia-Antipolis Cedex; France, vol. SA WG2, No. V1.7.0, Nov. 26, 2012 (Nov. 26, 2012), pp. 1-75, XP050650426, [retrieved on Nov. 26, 2012].

NEC : "Routing Policy Configuration Application Function", 3GPP Draft; S2-096689 ROUTINGPOLICYCONFIGURATIONFUNC-TION_FINAL, 3rd Generation Partnership Project (3GPP), Mobile Competence Centre; 650, Route Des Lucioles ; F-06921 Sophia-Antipolis Cedex ; France vol. SA WG2, No. San Jose del Cabo, Mexico; Nov. 16, 2009-Nov. 20, 2009, Nov. 10, 2009 (Nov. 18, 2009), XP050630277,t [retrieved on Nov. 10, 2009].

"3rd Generation Partnership Project; Technical Specification Group Services and System Aspects; IP flow mobility and seamless Wireless Local Area Network (WLAN) offload; Stage 2 (Release 11)", 3GPP Draft; 23261-B00, 3rd Generation Partnership Project (3GPP), Mobile Competence Centre ; 650, Route Des Lucioles ; F-06921 Sophia-Antipolis Cedex, France, Jul. 23, 2013 (Jul. 23, 2013), XP050725483, Retrieved from the Internet: URL:http://www .3gpp. org/ftp/tsg_sa/WG2 _Arch/Latest _SA2_Specs/Rel-11/ [retrieved on Jul. 23, 2013].

"3rd Generation Partnership Project; Technical Specification Group Services and System Aspects; Operator Policies for IP Interface Selection (OPIIS) (Release 12)" 3GPP Draft; 23853-C00, 3rd Generation Partnership Project (3GPP), Mobile Competence Centre, 650, Route Des Lucioles ; F-06921 Sophia-Antipolis Cedex; France, Jul. 23, 2013 (Jul. 23, 2013), XP050725534, Retrieved from the Internet: URL:http://www.3gpp.org/ftp/tsg_sa/WG2_Arch/Latest_ SA2_Specs/Rel-12/ [retrieved on Jul. 23, 2013].

International Search Report of PCT/CN2015/076771.

* cited by examiner

METHOD AND DEVICE FOR DETERMINING IP FLOW ROUTING RULE

This application is claims a US National Stage of International Application No. PCT/CN2015/076771, filed Apr. 16, 2015, designating the United States, and claiming the benefit of Chinese Patent Application No. 201410158951.1, filed with the Chinese Patent Office on Apr. 18, 2014 and entitled "Method and device for determining an IP flow routing rule", which is hereby incorporated by reference in its entirety.

FIELD

The present invention relates to the field of communications, and particularly to a method and device for determining an IP flow routing rule.

BACKGROUND

The Internet Protocol (IP) Flow Mobility (IFOM) technology has been focused on a solution to transmitting and moving an IP flow between a number of access technologies for a User Equipment (UE) connected with the same Packet Data network (PDN) connection using the different access technologies. For example, an operator can require that a best effort IP flow shall be offloaded through a Wireless Local Area Network, and an IP flow for a specific Quality of Service (QoS) is required shall gain an access through an Evolved Universal Mobile Telecommunication System (UMTS) Terrestrial Radio Access Network (E-UTRAN) for transmission.

The IFOM technology has been studied and standardized in the $3^{rd}$ Generation Partnership (3GPP) System Architecture Working Group 2 (SA2) starting with the Release 10 (R10), where the IFOM technology has been standardized based upon a terminal mobility management protocol, a preliminary study has been made on the IFOM technology based upon a network mobility management protocol starting with the R11 (not yet in the R12).

I. The IFOM solution based upon a terminal mobility management protocol is as follows:

Such an IFOM solution based upon the Dual Stack Mobile IP version 6 (DSMIPv6) protocol (with an S2c interface) has been defined in the TS 23.261 that mobility of an IP flow is primarily based upon IP flow binding information as depicted in Table 1:

TABLE 1

| IP flow binding information | | | | | | |
|---|---|---|---|---|---|---|
| Home Address | Routing Address | Binding ID | BID Priority | Flow ID | FID Priority | Routing Filter |
| HoA1 | CoA1 | BID1 | x | FID1 | a | Description of IP flows . . . |
|  |  |  |  | FID2 | b | Description of IP flows . . . |
| HoA1 | CoA2 | BID2 | y | FID3 | . . . | . . . |

Where the Home Address (HoA) is an IP address allocated by a Packet Data Network Gateway (PGW) for UE, the Care of Address (CoA) indicated by the Routing Address is an IP address of the UE at the non-3GPP side, the Binding ID (BID) is an identifier bound by the UE for an IP flow generated at each CoA, and provided with a priority, and the Flow ID (FID) defines a routing rule including a routing filter and a routing address, where the routing address is the HoA or the CoA.

If the UE is connected with the same PDN connection using a 3GPP access technology and a non-3GPP access technology, and decides to move an IP flow, then the UE will indicate information about the IP flow to be moved, to a PDN Gateway (PGW) in a Binding Update (BU) message, and particularly the UE indicates the updated routing rule to the PGW in the BU message; the PGW provides a Policy Control and Charging Rule Function (PCRF) entity with the received routing rule in an IP-Connectivity Access Network (CAN) Session Modify Request message; the PCRF entity stores mapping between a routing address and a Service Data Flow (SDF) which are received, and returns an IP-CAN Session Modify Response message to the PCRF entity; and the PGW indicates the routing rule accepted by the network to the UE in a Binding Acknowledge (BA) message.

II. The IFOM solution based upon a network mobility management protocol (NB-IFOM) is as follows:

Such IFOM solutions based upon the Proxy Mobile IP version 6 (PMIPv6) protocol (with S2a and S2b interfaces) and the General Packet Radio Service (GPRS) protocol (with an S2b interface) have been defined in the TR 23.861 that their general idea is the same as that of the DSMIPv6 based IFOM solution because the UE also indicates the updated routing rule to the PGW, except for their different applicable transmission protocols, so a repeated description thereof will be omitted here.

A UE-initiated NB-IFOM procedure has been defined, which may be triggered due to an Access Network Discovery and Selection Function (ANDSF) policy, a user preference, local operating environment information, etc. At present, a network initiated NB-IFOM also has been defined, which may be triggered due to network congestion, a change in IP flow characteristic, etc. However there has been absent so far particular solutions to initiating an NB-IFOM procedure by the network, and to defining an optimum IFOM strategy for both a UE-initiated NB-IFOM procedure and a network initiated NB-IFOM procedure.

SUMMARY

Embodiments of the invention provide a method and device for determining an IP flow routing rule as solutions to initiating an NB-IFOM procedure by a network, and to defining an optimum IFOM strategy for both a UE-initiated NB-IFOM procedure and a network initiated NB-IFOM Procedure.

An embodiment of the invention provides a method for determining an IP flow routing rule, the method including:

generating, by a first communication device in initiating an IFOM procedure, a first routing rule different from a routing rule currently enforced by a second communication device for the second communication device;

notifying, by the first communication device, the second communication device of the first routing rule to request the second communication device for enforcing the first routing rule; and determining, by the first communication device, a routing rule executed by the second communication device as a result according to a message returned by the second communication device.

Two application scenarios where the first communication device is a UE, and the second communication device is a network device; and where the first communication device is a network device, and the second communication device is a UE will be described below in details respectively.

In a first application scenario, the first communication device is a UE, and the second communication device is a network device.

In an implementation, in a first preferred implementation, determining, by the first communication device, the routing rule executed by the second communication device as a result according to the message returned by the second communication device includes:

determining, by the first communication device, that the routing rule enforced by the second communication device as a result is the first routing rule upon reception of a first message returned by the second communication device to notify the first communication device that the second communication device accepts the first routing rule.

In an implementation, in a second preferred implementation, determining, by the first communication device, the routing rule executed by the second communication device as a result according to the message returned by the second communication device includes:

receiving, by the first communication device, a second message returned by the second communication device to notify the first communication device that the second communication device does not accept the first routing rule, wherein the second message carries state information of the current network and/or characteristic information of an IP flow;

generating, by the first communication device, a second routing rule different from the first routing rule for the second communication device according to the information carried in the second message;

notifying, by the first communication device, the second communication device of the second routing rule to request the second communication device for enforcing the second routing rule; and receiving, by the first communication device, a third message returned by the second communication device to notify the first communication device that the second communication device accepts the second routing rule, and determining that the routing rule enforced by the second communication device as a result is the second routing rule.

In this implementation, generating, by the first communication device, the second routing rule for the second communication device according to the information carried in the second message includes:

generating, by the first communication device, the second routing rule for the second communication device according to at least one of an Access Network Discovery and Selection Function (ANDSF) policy, a user preference, and local operating environment information, and the information carried in the second message.

In a second application scenario, the first communication device is a network device, and the second communication device is a UE.

In an implementation, generating, by the first communication device in initiating the IFOM procedure, the first routing rule different from the routing rule currently enforced by the second communication device for the second communication device includes:

generating, by the first communication device in initiating the IFOM procedure, the first routing rule for the second communication device according to state information of the current network, and/or characteristic information of an IP flow.

In an implementation, optionally notifying, by the first communication device, the second communication device of the first routing rule includes:

notifying, by the first communication device, the second communication device of the first routing rule, and state information of the current network, and/or characteristic information of an IP flow.

It shall be noted that alternatively the first communication device may not notify the second communication device of the state information of the current network, and/or the characteristic information of the IP flow.

In this scenario, further to any one of the embodiments above, in a first preferred implementation, determining, by the first communication device, the routing rule executed by the second communication device as a result according to the message returned by the second communication device includes:

determining, by the first communication device, that the routing rule enforced by the second communication device as a result is the first routing rule upon reception of a first message returned by the second communication device to notify the first communication device that the second communication device accepts the first routing rule.

In a second preferred implementation, determining, by the first communication device, the routing rule executed by the second communication device as a result according to the message returned by the second communication device includes:

receiving, by the first communication device, a fourth message returned by the second communication device to notify the first communication device that the second communication device does not accept the first routing rule, wherein the fourth message carries a third routing rule generated by the second communication device; and determining, by the first communication device, that the routing rule enforced by the second communication device as a result is the third routing rule;

wherein the third routing rule is generated by the second communication device according to state information of the current network, and/or characteristic information of an IP flow, and at least one of an ANDSF policy, a user preference, and local operating environment information.

Further to any one of the embodiments above, the ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or a routing criterion in the ANDSF policy includes a condition to be satisfied by an IP flow to be transmitted over the current network.

Furthermore the condition to be satisfied by an IP flow to be transmitted over the current network includes at least one of a congestion extent of the network to be satisfied, an IP flow delay to be satisfied, and a jitter characteristic to be satisfied.

An embodiment of the invention provides another method for determining an IP flow routing rule, the method including:

receiving, by a second communication device, a first routing rule notified by a first communication device, which is different from a routing rule currently enforced by the second communication device;

deciding, by the second communication device, whether to accept the first routing rule, according to a preset condition; and returning, by the second communication device, different messages to the first communication device according to respective decision results.

Two application scenarios where the first communication device is a UE, and the second communication device is a network device; and where the first communication device is a network device, and the second communication device is a UE will be described below in details respectively.

In a first application scenario, the first communication device is a UE, and the second communication device is a network device.

In an implementation, deciding, by the second communication device, whether to accept the first routing rule, according to the preset condition, and returning the different messages to the first communication device according to the respective decision results includes:

deciding, by the second communication device, whether to accept the first routing rule, according to state information of the current network, and/or characteristic information of an IP flow;

returning, by the second communication device, a first message to the first communication device to notify the first communication device that the second communication device accepts the first routing rule, and enforcing the first routing rule, upon deciding to accept the first routing rule; and returning, by the second communication device, a second message to the first communication device to notify the first communication device that the second communication device does not accept the first routing rule, wherein the second message carries the state information of the current network, and/or the characteristic information of the IP flow, upon deciding not to accept the first routing rule.

Furthermore after the second communication device returns the second message to the first communication device, the method further includes:

receiving, by the second communication device, a second routing rule notified by the first communication device, and enforcing the second routing rule, wherein the second routing rule is generated by the first communication device according to the information carried in the second message.

In a second application scenario, the first communication device is a network device, and the second communication device is a UE.

In an implementation, deciding, by the second communication device, whether to accept the first routing rule, according to the preset condition, and returning the different messages to the first communication device according to the respective decision results includes:

deciding, by the second communication device, whether to accept the first routing rule according to state information of the current network, and/or characteristic information of an IP flow;

returning, by the second communication device, a first message to the first communication device to notify the first communication device that the second communication device accepts the first routing rule, and enforcing the first routing rule, upon deciding to accept the first routing rule; and generating, by the second communication device, a third routing rule for the second communication device according to the state information of the current network, and/or the characteristic information of the IP flow, enforcing the third routing rule, and returning a third message to the first communication device to notify the first communication device that the second communication device does not accept the first routing rule, wherein the third message carries the third routing rule, upon deciding not to accept the first routing rule.

Here the state information of the current network, and/or the characteristic information of the IP flow, according to which to decide whether to accept the first routing rule may or may not be notified by the first communication device.

Furthermore generating, by the second communication device, the third routing rule for the second communication device according to the state information of the current network, and/or the characteristic information of the IP flow, notified by the first communication device includes:

generating, by the second communication device, the third routing rule for the second communication device according to at least one of an ANDSF policy, a user preference, and local operating environment information, and the state information of the current network, and/or the characteristic information of the IP flow.

Further to any one of the embodiments above, the ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or a routing criterion in the ANDSF policy includes a condition to be satisfied by an IP flow to be transmitted over the current network.

Furthermore the condition to be satisfied by an IP flow to be transmitted over the current network includes at least one of a congestion extent of the network to be satisfied, an IP flow delay to be satisfied, and a jitter characteristic to be satisfied.

An embodiment of the invention provides a communication device including:

a routing rule generating module configured to generate in initiating an IFOM procedure a first routing rule different from a routing rule currently enforced by a second communication device for the second communication device;

a notifying module configured to notify the second communication device of the first routing rule to request the second communication device for enforcing the first routing rule; and a processing module configured to determine a routing rule executed by the second communication device as a result according to a message returned by the second communication device.

Two application scenarios where the communication device is a UE, and the second communication device is a network device; and where the communication device is a network device, and the second communication device is a UE will be described below in details respectively.

In a first application scenario, the communication device is a UE, and the second communication device is a network device.

In this scenario, in a first preferred implementation, the processing module is configured:

to determine that the routing rule enforced by the second communication device as a result is the first routing rule upon reception of a first message returned by the second communication device to notify the communication device that the second communication device accepts the first routing rule.

In a second preferred implementation, the processing module is configured:

to receive a second message returned by the second communication device to notify the communication device that the second communication device does not accept the first routing rule, wherein the second message carries state information of the current network and/or characteristic information of an IP flow; to generate a second routing rule different from the first routing rule for the second communication device according to the information carried in the second message; to notify the second communication device of the second routing rule to request the second communication device for enforcing the second routing rule; and to receive a third message returned by the second communication device to notify the communication device that the second communication device accepts the second routing rule, and to determine that the routing rule enforced by the second communication device as a result is the second routing rule.

In this implementation, the processing module configured to generate the second routing rule for the second communication device according to the information carried in the second message is configured:

to generate the second routing rule for the second communication device according to at least one of an Access Network Discovery and Selection Function (ANDSF) policy, a user preference, and local operating environment information, and the information carried in the second message.

In a second application scenario, the communication device is a network device, and the second communication device is a UE.

In this scenario, the routing rule generating module is configured:

to generate in initiating the IFOM procedure the first routing rule for the second communication device according to state information of the current network, and/or characteristic information of an IP flow.

In this scenario, the notifying module is configured:

to notify the second communication device of the first routing rule, and state information of the current network, and/or characteristic information of an IP flow.

It shall be noted that alternatively the second communication device may not be notified of the state information of the current network, and/or the characteristic information of the IP flow.

In this scenario, in a first preferred implementation, the processing module is configured:

to determine that the routing rule enforced by the second communication device as a result is the first routing rule upon reception of a first message returned by the second communication device to notify the communication device that the second communication device accepts the first routing rule.

In a second preferred implementation, the processing module is configured:

to receive a fourth message returned by the second communication device to notify the communication device that the second communication device does not accept the first routing rule, wherein the fourth message carries a third routing rule generated by the second communication device; and to determine that the routing rule enforced by the second communication device as a result is the third routing rule;

wherein the third routing rule is generated by the second communication device according to state information of the current network, and/or characteristic information of an IP flow, and at least one of an ANDSF policy, a user preference, and local operating environment information.

An embodiment of the invention provides another communication device including:

a receiving module configured to receive a first routing rule notified by a first communication device, which is different from a routing rule currently enforced by the communication device; and a processing module configured to decide whether to accept the first routing rule, according to a preset condition, and to return different messages to the first communication device according to respective decision results.

Two application scenarios where the communication device is a UE, and the first communication device is a network device; and where the first communication device is a network device, and the communication device is a UE will be described below in details respectively.

In a first application scenario, the communication device is a network device, and the first communication device is a UE.

In this scenario, the processing module is configured:

to decide whether to accept the first routing rule, according to state information of the current network, and/or characteristic information of an IP flow;

to return a first message to the first communication device to notify the first communication device that the communication device accepts the first routing rule, and to enforce the first routing rule, upon deciding to accept the first routing rule; and to return a second message to the first communication device to notify the first communication device that the communication device does not accept the first routing rule, wherein the second message carries the state information of the current network, and/or the characteristic information of the IP flow, upon deciding not to accept the first routing rule.

Preferably the receiving module is further configured:

to receive a second routing rule notified by the first communication device, and to enforce the second routing rule, wherein the second routing rule is generated by the first communication device according to the information carried in the second message.

In a second application scenario, the communication device is a UE, and the first communication device is a network device.

In this scenario, the processing module is configured:

to decide whether to accept the first routing rule according to state information of the current network, and/or characteristic information of an IP flow;

to return a first message to the first communication device to notify the first communication device that the communication device accepts the first routing rule, and to enforce the first routing rule, upon deciding to accept the first routing rule; and to generate a third routing rule for the communication device according to the state information of the current network, and/or the characteristic information of the IP flow, notified by the first communication device, to enforce the third routing rule, and to return a third message to the first communication device to notify the first communication device that the communication device does not accept the first routing rule, wherein the third message carries the third routing rule, upon deciding not to accept the first routing rule.

Preferably the processing module configured to generate the third routing rule for the communication device according to the state information of the current network, and/or the characteristic information of the IP flow, notified by the first communication device, is configured:

to generate the third routing rule for the communication device according to at least one of an ANDSF policy, a user preference, and local operating environment information, and the state information of the current network, and/or the characteristic information of the IP flow, notified by the first communication device.

An embodiment of the invention provides a user equipment including a transceiver, and at least one processor connected with the transceiver, wherein:

I. For a UE-initiated IFOM procedure:

the processor is configured to generate in initiating an IFOM procedure a first routing rule different from a routing rule currently enforced by a network device; and to determine a routing rule executed by the network device as a result according to a message returned by the network device; and The transceiver is configured to notify the network device of the first routing rule generated by the processor to request the network device for enforcing the first routing rule, and to receive the message returned by the network device Furthermore in a first preferred implementation, the processor is configured:

to determine that the routing rule enforced by the network device as a result is the first routing rule after the transceiver receives a first message returned by the network device to notify the user equipment that the network device accepts the first routing rule.

In this scenario, in a second preferred implementation, the processor is configured, after the transceiver receives a second message returned by the network device to notify the user equipment that the network device does not accept the first routing rule, wherein the second message carries state information of the current network and/or characteristic information of an IP flow, to generate a second routing rule different from the first routing rule for the network device according to the information carried in the second message;

the transceiver is configured to notify the network device of the second routing rule to request the network device for enforcing the second routing rule;

the transceiver is further configured, after notifying the network device of the second routing rule, to receive a third message returned by the network device to notify the user equipment that the network device accepts the second routing rule; and the processor is further configured to determine that the routing rule enforced by the network device as a result is the second routing rule.

In this implementation, the processor configured to generate the second routing rule for the network device according to the information carried in the second message is configured:

to generate the second routing rule for the second communication device according to at least one of an Access Network Discovery and Selection Function (ANDSF) policy, a user preference, and local operating environment information, and the information carried in the second message.

II. For a network-initiated IFOM procedure:

the processor is configured:

to decide whether to accept the first routing rule, according to state information of the current network, and/or characteristic information of an IP flow;

to enforce the first routing rule, and to trigger the transceiver to return a first message to the network device to notify the network device that the user equipment accepts the first routing rule, upon deciding to accept the first routing rule; and to generate a third routing rule for the user equipment according to the state information of the current network, and/or the characteristic information of the IP flow, to execute the third routing rule, and to trigger the transceiver to return a third message to the network device to notify the network device that the user equipment does not accept the first routing rule, wherein the third message carries the third routing rule, upon deciding not to accept the first routing rule.

Here the state information of the current network, and/or the characteristic information of the IP flow may or may not be notified by the network device.

Furthermore the processor configured to generate the third routing rule for the user equipment according to the state information of the current network, and/or the characteristic information of the IP flow is configured:

to generate the third routing rule for the user equipment according to at least one of an ANDSF policy, a user preference, and local operating environment information, and the state information of the current network, and/or the characteristic information of the IP flow.

An embodiment of the invention provides a network device including a transceiver, and at least one processor connected with the transceiver, wherein:

I. For a UE-initiated IFOM procedure:

the processor is configured:

to decide whether to accept a first routing rule, according to state information of the current network, and/or characteristic information of an IP flow;

to enforce the first routing rule, and to trigger the transceiver to return a first message to a user equipment to notify the user equipment that the network device accepts the first routing rule, upon deciding to accept the first routing rule; and to trigger the transceiver to return a second message to the user equipment to notify the user equipment that the network device does not accept the first routing rule, wherein the second message carries the state information of the current network, and/or the characteristic information of the IP flow, upon deciding not to accept the first routing rule.

In this scenario, the transceiver is further configured to receive a second routing rule notified by the user equipment, wherein the second routing rule is generated by the user equipment according to the information carried in the second message; and the processor is further configured to enforce the second routing rule.

II. For a network-initiated IFOM procedure:

the processor is configured to generate in initiating an IFOM procedure a first routing rule different from a routing rule currently enforced by a user equipment for the user equipment, and to determine a routing rule executed by the user equipment as a result according to a message returned by the user equipment; and the transceiver is configured to notify the user equipment of the first routing rule to request the user equipment for enforcing the first routing rule.

In an implementation, the processor is configured to generate in initiating the IFOM procedure the first routing rule for the user equipment according to state information of the current network, and/or characteristic information of an IP flow.

In an implementation, the transceiver is configured to notify the user equipment of the first routing rule, and the state information of the current network, and/or the characteristic information of the IP flow.

In an implementation, in a first preferred implementation, the processor is configured:

to determine that the routing rule enforced by the user equipment as a result is the first routing rule after the transceiver receives a first message returned by the user equipment to notify the network device that the user equipment accepts the first routing rule.

In this scenario, in a second preferred implementation, the processor is configured to receive a fourth message returned by the user equipment to notify the network device that the user equipment does not accept the first routing rule, wherein the fourth message carries a third routing rule generated by the user equipment; and the processor is configured to determine that the routing rule enforced by the user equipment as a result is the third routing rule;

wherein the third routing rule is generated by the user equipment according to state information of the current network, and/or characteristic information of an IP flow, and at least one of an ANDSF policy, a user preference, and local operating environment information.

The embodiments of the invention provide a method and device for determining an IP flow routing rule, where the first communication device initiating the IFOM procedure generates the first routing rule different from the routing rule currently enforced by the second communication device; the first communication device notifies the second communication device of the first routing rule to request the second communication device for enforcing the first routing rule; and the first communication device determines the routing rule executed by the second communication device as a result according to the message returned by the second communication device, so that there is provided a solution to defining an optimum routing rule as a result of negotiation between the network device and the UE.

The second communication device receives the first routing rule notified by the first communication device, which is different from the routing rule currently enforced by the second communication device; the second communication device decides whether to accept the first routing rule, according to the preset condition; and the second communication device returns the different messages to the first communication device according to the respective decision results, so that there is provided a solution to defining an optimum routing rule as a result of negotiation between the network device and the UE.

DETAILED DESCRIPTION OF THE EMBODIMENTS

Figure 1:
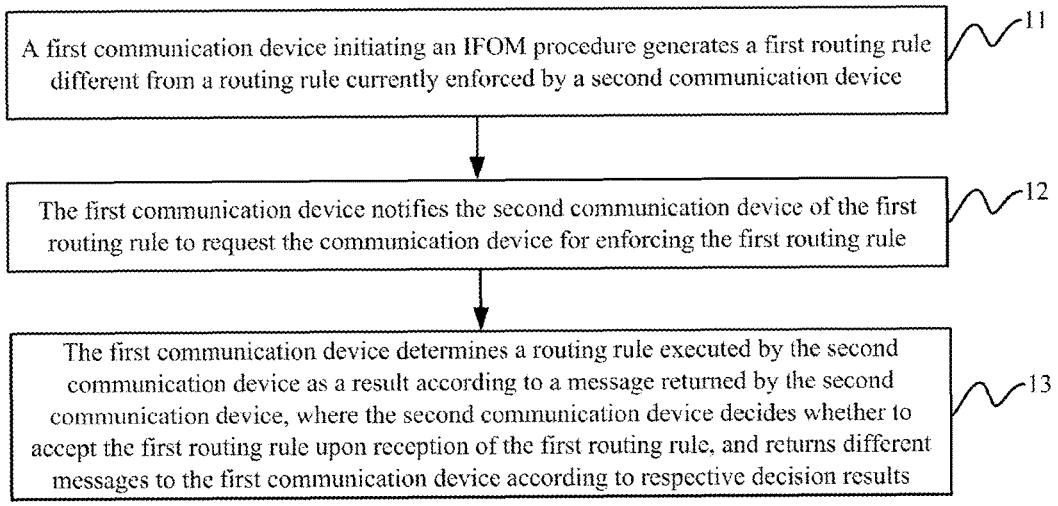
FIG. 1 is a schematic diagram of a method for determining an IP flow routing rule according to an embodiment of the invention.

Embodiments of the invention provide a technical solution to defining an optimum routing rule as a result of negotiation between a network device and a UE. The embodiments of the invention will be described below in further details with reference to the drawings. It shall be appreciated that the embodiments described here are merely intended to illustrate and describe, but not to limit the invention Referring to FIG. 1, a method for determining an IP flow routing rule according to an embodiment of the invention can include the following operations:

In the operation 11, a first communication device initiating an IFOM procedure generates a first routing rule different from a routing rule currently enforced by a second communication device;

In the operation 12, the first communication device notifies the second communication device of the first routing rule to request the second communication device for enforcing the first routing rule; and In the operation 13, the first communication device determines a routing rule executed by the second communication device as a result according to a message returned by the second communication device.

Here the second communication device decides whether to accept the first routing rule upon reception of the first routing rule, and returns different messages to the first communication device according to respective decision results.

In an embodiment of the invention, the first communication device is a UE, and the second communication device is a network device; or the first communication device is a network device, and the second communication device is a UE.

Preferably the network device is a PGW anchored by a PDN connection of the UE, or the network device includes a PGW and a PCRF entity anchored by a PDN connection of the UE.

The first communication device in an embodiment of the invention refers to an IFOM procedure initiating communication device. Particularly for a UE-initiated IFOM procedure, the first communication device is a UE, and at this time, the second communication device is a network device;

and for a network-initiated IFOM procedure, the first communication device is a network device, and at this time, the second communication device is a UE.

In the embodiments of the invention, the first communication device initiating the IFOM procedure generates the first routing rule different from the routing rule currently enforced by the second communication device; the first communication device notifies the second communication device of the first routing rule to request the second communication device for enforcing the first routing rule; and the first communication device determines the routing rule executed by the second communication device as a result according to the message returned by the second communication device, so that there is provided a solution to defining an optimum routing rule as a result of negotiation between the network device and the UE.

Two application scenarios where the first communication device is a UE, and the second communication device is a network device; and where the first communication device is a network device, and the second communication device is a UE will be described below in details respectively.

In a first application scenario, the first communication device is a UE, and the second communication device is a network device, where the second communication device is a PGW anchored by a PDN connection of the first communication device, or the second communication device includes a PGW and a PCRF entity anchored by a PDN connection of the first communication device.

In this scenario, particularly in the operation 11, the first communication device generates the first routing rule according to at least one of an ADNSF strategy, a user preference, and local operating environment information.

In an implementation, the first communication device has stored therein the ANDSF policy configured by an ANDSF entity for the first communication device, or the first communication device initiating the IFOM procedure retrieves the ANDSF policy from an ANDSF entity.

In an implementation, according to the different protocol used, the first communication device notifies the second communication device of the first routing rule in the operation 12 particularly in the following approaches:

In a first approach, if the DISMIPv6 protocol is applied, then the first communication device can communicate directly with the PGW anchored by the PDN connection for the first communication device, so particularly in the operation 12:

The first communication device transmits a Binding Update message to the PGW anchored by the PDN connection of the first communication device by carrying the first routing rule in the Binding Update message to request the PGW for enforcing the first routing rule.

In this approach, the PGW can decide whether to accept the first routing rule, or the PCRF entity can decide whether to accept the first routing rule.

If the PCRF entity decides whether to accept the first routing rule, then furthermore the PGW will notify the PCRF entity of the first routing rule so that the PCRF entity decides whether to accept the first routing rule, and the PCRF entity will return the decision result to the PGW.

In a second approach, if the S2a-GTP protocol is applied, then the first communication device can not communicate directly with the PGW anchored by the PDN connection of the first communication device, so:

If the first communication device notifies the second communication device through a WLAN access network, then particularly in the operation 12, the first communication device will transmit the first routing rule to a TWAG so that the TWAG notifies the PGW of the first routing rule in a GTP message.

If the first communication device notifies the second communication device through a 3GPP access network, then particularly in the operation 12, the first communication device will transmit the first routing rule to a Mobility Management Entity (MME) so that the MME notifies the PGW of the first routing rule through a Serving Gateway (SGW).

In this approach, the PGW can decide whether to accept the first routing rule, or the PCRF entity can decide whether to accept the first routing rule.

If the PCRF entity decides whether to accept the first routing rule, then furthermore the PGW will notify the PCRF entity of the first routing rule so that the PCRF decides whether to accept the first routing rule, and the PCRF entity will return the decision result to the PGW.

In this scenario, the first communication device determines the routing rule enforced by the second communication device as a result according to the message returned by the second communication device in the operation 13 particularly in the following two approaches:

In a first approach, if the second communication device accepts the first routing rule, then:

Particularly in the operation 13, the first communication device will determine that the routing rule enforced by the second communication device as a result is the first routing rule upon reception of a first message returned by the second communication device to notify the first communication device that the second communication device accepts the first routing rule.

In a second approach, if the second communication device does not accept the first routing rule, then particularly in the operation 13:

The first communication device receives a second message returned by the second communication device to notify the first communication device that the second communication device does not accept the first routing rule, where the second message carries state information of an access network and/or characteristic information of an IP flow;

The first communication device generates a second routing rule different from the first routing rule for the second communication device according to the information carried in the second message;

The first communication device notifies the second communication device of the second routing rule to request the second communication device for enforcing the second routing rule; and The first communication device determines that the routing rule enforced by the second communication device as a result is the second routing rule according to a third message returned by the second communication device to notify the first communication device that the second communication device accepts the second routing rule;

Where the state information of the access network includes at least information indicating a current congestion extent of the access network; and the characteristic information of the IP flow includes at least one of delay information of the IP flow, and information indicating a jitter characteristic of the IP flow.

Preferably the first communication device generates the second routing rule for the second communication device according to the information carried in the second message as follows:

The first communication device generates the second routing rule for the second communication device according to at least one of the ANDSF policy, the user preference, and the local operating environment information, and the information carried in the second message.

In a second application scenario, the first communication device is a network device, and the second communication device is a UE, where the first communication device is a PGW anchored by a PDN connection of the second communication device, or the first communication device includes a PGW and a PCRF entity anchored by a PDN connection of the second communication device.

In this scenario, particularly in the operation 11, the first communication device initiating the IFOM procedure generates the first routing rule for the second communication device according to state information of an access network, and/or characteristic information of an IP flow.

Particularly the PCRF entity initiating the IFOM procedure can generate the first routing rule for the second communication device, or the PGW, anchored by the PDN connection of the second communication device, initiating the IFOM procedure can generate the first routing rule for the second communication device;

Where the state information of the access network at least includes information indicating a current congestion extent of the access network; and the characteristic information of the IP flow includes at least one of delay information of the IP flow, and information indicating a jitter characteristic of the IP flow.

In this scenario, particularly in the operation 12, the first communication device notifies the second communication device of the first routing rule, and the state information of the access network, and/or the characteristic information of the IP flow.

Particularly if the first communication device generates the first routing rule according to the state information of the access network in the operation 11, then particularly in the operation 12, the first communication device will notify the second communication device of the first routing rule, and the state information of the access network;

If the first communication device generates the first routing rule according to the characteristic information of the currently transmitted IP flow in the operation 11, then particularly in the operation 12, the first communication device will notify the second communication device of the first routing rule, and the characteristic information of the IP flow; and If the first communication device generates the first routing rule according to the state information of the access network, and the state information of the currently transmitted IP flow in the operation 11, then particularly in the operation 12, the first communication device will notify the second communication device of the first routing rule, the state information of the access network, and the characteristic information of the IP flow.

In an implementation, if the PCRF entity generates the first routing rule, then the first communication device will notify the second communication device of the first routing rule, the state information of the access network, and the characteristic information of the IP flow in the operation 12 in the following several approaches dependent upon an applicable protocol:

In a first approach, if the DISMIPv6 protocol is applied, then the PCRF entity can communicate directly with the PGW anchored by the PDN connection of the second communication device, then particularly in the operation 12:

The PCRF entity transmits the first routing rule to the PGW anchored by the PDN connection of the second communication device so that the PGW transmits the first routing rule to the second communication device.

In a second approach, if the S2a-GTP protocol is applied, then the PCRF entity can not communicate directly with the PGW anchored by the PDN connection of the second communication device, then:

If the second communication device accesses network through a WLAN, then particularly in the operation 12, the PCRF entity will transmit the first routing rule to a TWAG so that the TWAG notifies the PGW of the first routing rule in a GTP message, and the PGW further notifies the second communication device of the first routing rule.

If the second communication device accesses network through a 3GPP, then particularly in the operation 12, the PCRF entity will transmit the first routing rule to an SGW so that the SGW notifies the PGW of the first routing rule through an MME, and the PGW further notifies the second communication device of the first routing rule.

In this scenario, the first communication device performs different processes particularly in the following approaches according to the message returned by the second communication device in the operation 13:

In a first approach, if the second communication device accepts the first routing rule, then:

Particularly in the operation 13, the first communication device will determine that the routing rule enforced by the second communication device as a result is the first routing rule upon reception of a first message returned by the second communication device to notify the first communication device that the second communication device accepts the first routing rule.

In a second approach, if the second communication device does not accept the first routing rule, then particularly in the operation 13:

The first communication device receives a fourth message returned by the second communication device to notify the first communication device that the second communication device does not accept the first routing rule, where the fourth message carries a third routing rule generated by the second communication device; and The first communication device determines that the routing rule enforced by the second communication device as a result is the third routing rule;

Where the third routing rule is generated by the second communication device according to the state information of the current network, and/or the characteristic information of the IP flow, and at least one of the ANDSF policy, the user preference, and the local operating environment information.

Further to any one of the embodiments above, in order to support negotiation between the first communication device and the second communication device, the ANDSF policy is further extended in an embodiment of the invention as follows:

The ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or The routing rule in the ANDSF policy includes a condition to be satisfied by an IP flow to be transmitted over the current network.

Preferably the condition to be satisfied by an IP flow to be transmitted over the current network includes at least one of a congestion extent of the network to be satisfied, an IP flow delay to be satisfied, and a jitter characteristic to be satisfied.

Figure 2:
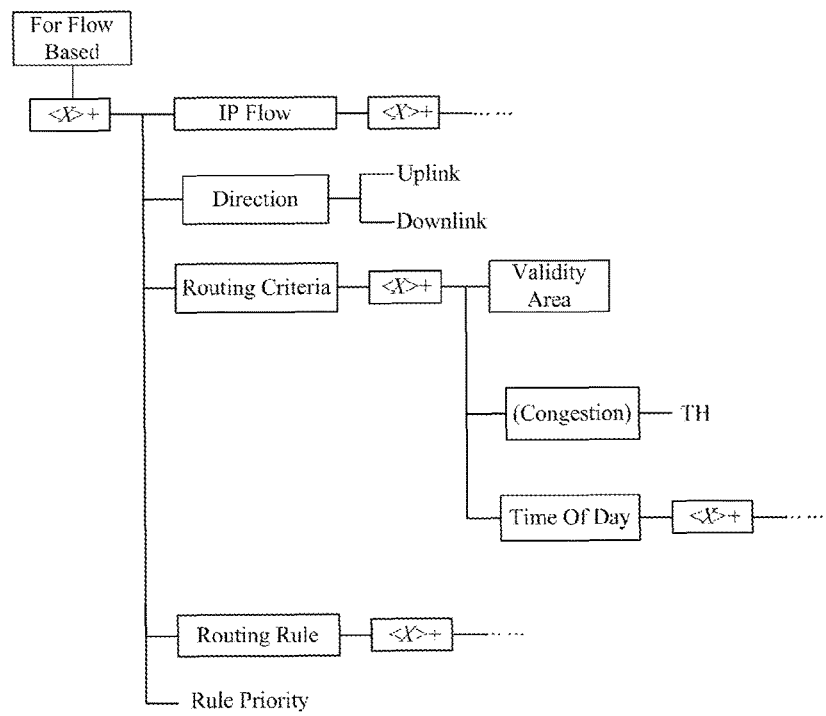
FIG. 2 is a schematic diagram of an extended ANDSF policy according to an embodiment of the invention.

By way of an example, the structured of the extended IFOM rule in the ADNSF strategy is as illustrated in FIG. 2 where "Direction" includes Uplink (i.e., the routing rule indicating an uplink access technology and/or access network for routing an uplink IP flow of the UE side satisfying a preset IP traffic filter) and Downlink (i.e., the routing rule indicating a downlink access technology and/or access network for routing a downlink IP flow of the Packet Data Network Gateway (PGW) side satisfying a preset IP traffic filter), and the congestion extent of the network of the condition to be satisfied by an IP flow to be transmitted over the current network is added to Routine Criteria, for example, given a threshold condition (TH) to be satisfied, if the congestion degree of the current network is no more than TH, then it will indicate that the current network is not congested; and if the congestion degree of the current network is more than TH, then it will indicate that the current network is congested.

Figure 3:
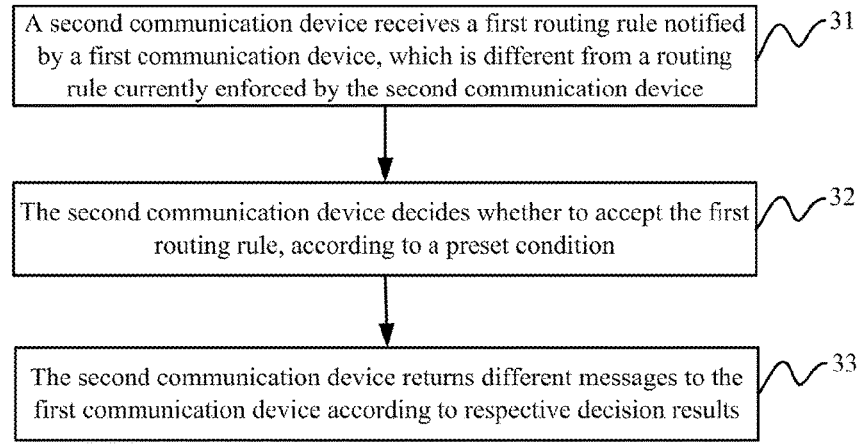
FIG. 3 is a schematic diagram of another method for determining an IP flow routing rule according to an embodiment of the invention.

Based upon the same inventive idea, an embodiment of the invention further provides a method for determining an IP flow routing rule, and referring to FIG. 3, the method includes:

In the operation 31, a second communication device receives a first routing rule notified by a first communication device, which is different from a routing rule currently enforced by the second communication device;

In the operation 32, the second communication device decides whether to accept the first routing rule, according to a preset condition; and In the operation 33, the second communication device returns different messages to the first communication device according to respective decision results.

In an embodiment of the invention, the first communication device is a UE, and the second communication device is a network device; or the first communication device is a network device, and the second communication device is a UE.

Preferably the network device is a PGW anchored by a PDN connection of the UE, or the network device includes a PGW and a PCRF entity anchored by a PDN connection of the UE.

In an embodiment of the invention, the second communication device receives the first routing rule notified by the first communication device, which is different from the routing rule currently enforced by the second communication device; the second communication device decides whether to accept the first routing rule, according to the preset condition; and the second communication device returns the different messages to the first communication device according to the respective decision results, so that there is provided a solution to defining an optimum routing rule as a result of negotiation between the network device and the UE.

Two application scenarios where the first communication device is a UE, and the second communication device is a network device; and where the first communication device is a network device, and the second communication device is a UE will be described below in details respectively.

In a first application scenario, the first communication device is a UE, and the second communication device is a network device.

In this scenario, the second communication device decides whether to accept the first routing rule, according to the preset condition as follows:

The second communication device determines decides whether to accept the first routing rule, according to state information of the current network, and/or characteristic information of an IP flow;

The second communication device returns a first message to the first communication device to notify the first communication device that the second communication device accepts the first routing rule, and enforces the first routing rule, upon deciding to accept the first routing rule; and The second communication device returns a second message to the first communication device to notify the first communication device that the second communication device does not accept the first routing rule, where the second message carries the state information of the current network, and/or the characteristic information of the IP flow, upon deciding not to accept the first routing rule.

Particularly if the second communication device decides not to accept the first routing rule, according to the state information of the current network, then the second message will carry the state information of the current network; if the second communication device decides not to accept the first routing rule, according to the characteristic information of the IP flow then the second message will carry the characteristic information of the IP flow; and if the second communication device decides not to accept the first routing rule, according to the state information of the current network, and the characteristic information of the IP flow, then the second message will carry the state information of the current network, and the characteristic information of the IP flow.

Furthermore after the second communication device returns the second message to the first communication device, then the method will further include: the second communication device receives a second routing rule notified by the first communication device, and enforces the second routing rule, where the second routing rule is generated by the first communication device according to the information carried in the second message.

In a second application scenario, the first communication device is a network device, and the second communication device is a UE.

In this scenario, the second communication device decides whether to accept the first routing rule, according to the preset condition as follows:

The second communication device decides whether to accept the first routing rule according to state information of the current network, and/or characteristic information of an IP flow;

The second communication device returns a first message to the first communication device to notify the first communication device that the second communication device accepts the first routing rule, and enforces the first routing rule, upon deciding to accept the first routing rule; and The second communication device generates a third routing rule for the second communication device according to the state information of the current network, and/or the characteristic information of the IP flow, enforces the third routing rule, and returns a third message to the first communication device to notify the first communication device that the second communication device does not accept the first routing rule, where the third message carries the third routing rule, upon deciding not to accept the first routing rule.

Particularly if the first communication device notifies the second communication device of the first routing rule, and state information of an access network, then the second communication device will generate the third routing rule for the second communication device according to the state information of the access network;

If the first communication device notifies the second communication device of the first routing rule, and the characteristic information of the IP flow, then the second communication device will generate the third routing rule for the second communication device according to the characteristic information of the IP flow; and If the first communication device notifies the second communication device of the first routing rule, state information of an access network, and the characteristic information of the IP flow, then the second communication device will generate the third routing rule for the second communication device according to the state information of the currently transmitted IP flow, and the state information of the access network.

Preferably the second communication device generates the third routing rule for the second communication device according to the state information of the current network, and/or the characteristic information of the IP flow as follows:

The second communication device generates the third routing rule for the second communication device according to at least one of an ANDSF policy, a user preference, and local operating environment information, and the state information of the current network, and/or the characteristic information of the IP flow.

Further to any one of the embodiments above, in order to support negotiation between the first communication device and the second communication device, the ANDSF policy is further extended in an embodiment of the invention as follows:

The ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or The routing criteria in the ANDSF policy includes a condition to be satisfied by an IP flow to be transmitted over the current network.

Preferably the condition to be satisfied by an IP flow to be transmitted over the current network includes at least one of a congestion extent of the network to be satisfied, an IP flow delay to be satisfied, and a jitter characteristic to be satisfied.

A method for determining an IP flow routing rule according to an embodiment of the invention will be described below in details from the perspective of an interaction process between a first communication device and a second communication device in the following four particular embodiments thereof.

Figure 4:
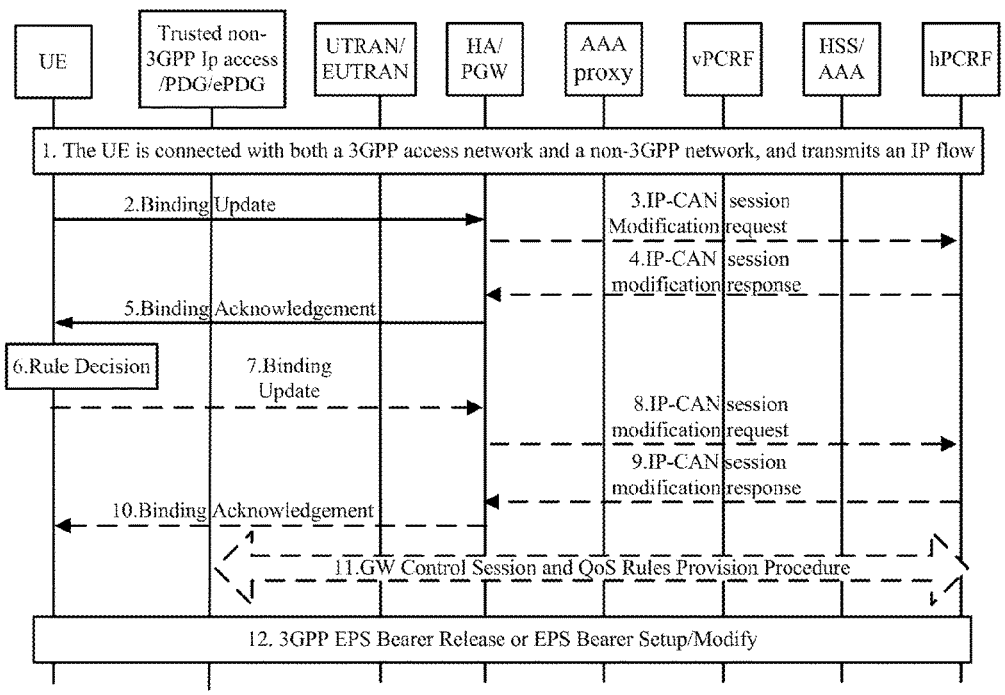
FIG. 4 is a schematic flow chart according to a first embodiment of the invention.

In a first embodiment, this embodiment relates to a UE-initiated IFOM procedure including DISMIPv6 based negotiation between a UE and the network side in a particular process as illustrated in FIG. 4 including:

1. The UE is connected with both a 3GPP access network and a non-3GPP network, and transmits an IP flow through the 3GPP access network and the non-3GPP access network under a routing rule.

2. The UE transmits a Binding Update (HoA, BID, FID) message to a PGW (HA) to request the HA for enforcing a new routing rule, where functions of the Home Agent (HA) are integrated in the PGW.

3. The PGW provides a PCRF entity with the routing rule in an IP Connectivity Access Network (IP-CAN) Session Modify Request message.

4. If the PCRF entity determines that the routing rule is not appropriate, according to the state of the current network (e.g. the congested network), then the PCRF will return the state information of the network to the PGW; and if the PCRF accepts the routing rule, then the PCRF will return an acknowledgement directly without proceeding to the operations 7 to 10.

5. The PGW (HA) returns a Binding Acknowledge (Lifetime, HoA, BID, FID) message carrying the state information of the network to the UE.

6. The UE checks the modified routing rule for appropriateness according to the state information of the network and an ANDSF policy, and if the modified routing rule complies with the ANDSF policy, then the UE will accept it; otherwise, the UE will reject it.

7 to 10. Similarly to the operations 2 to 5, the UE transmits an indicator to the network that the modified routing rule is accepted or rejected, and the network acknowledges the indicator of the UE.

11. There is a resource setup/release procedure at the non-3GPP access side.

12. There is a resource setup/release procedure at the 3GPP access side.

Figure 5:
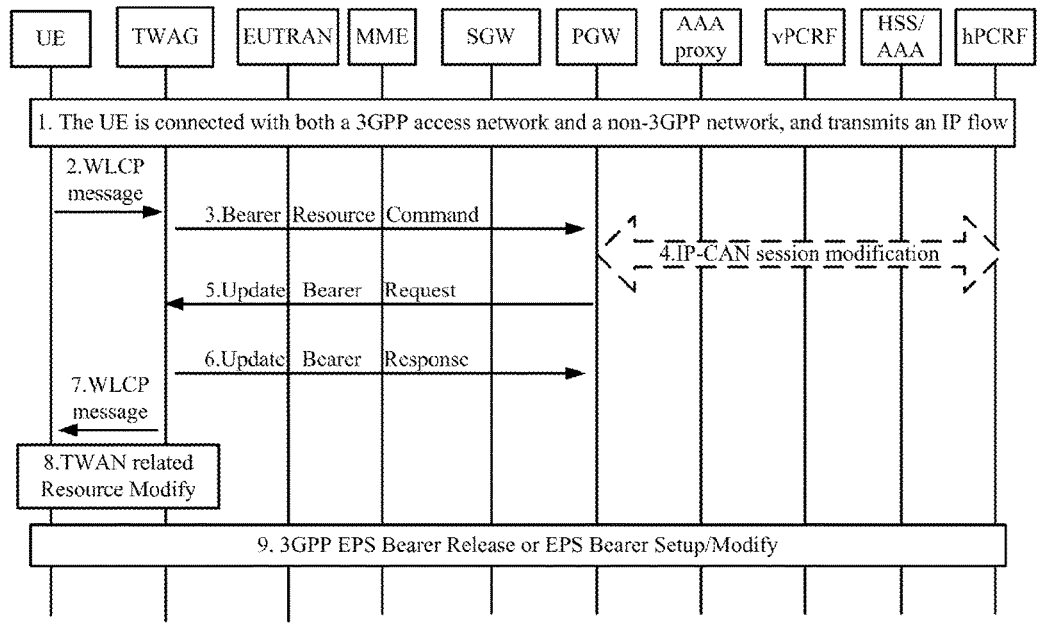
FIG. 5 is a schematic flow chart according to a second embodiment of the invention.

In a second embodiment, this embodiment relates to a UE-initiated IFOM procedure including S2a-GTP based negotiation between a UE and the network side in a particular process as illustrated in FIG. 5 including:

1. The UE is connected with both a 3GPP access network and a non-3GPP network, and transmits an IP flow through the 3GPP access network and the non-3GPP access network under a routing rule.

2. The UE indicates the updated routing rule to a TWAG in a WLAN Control Protocol (WLCP) message.

3. The TWAG indicates the updated routing rule to a PGW in a GTP message.

4. The PGW interacts with a PCRF entity, and provides the PCRF entity with the updated routing rule, and the PCRF determines whether the updated routing rule is appropriate, according to state information of the access network/characteristic information of the IP flow. In this embodiment, the PCRF entity determines that the updated routing rule is appropriate, and acknowledges the updated routing rule of the PGW.

5 to 6. The PGW notifies the TWAG that the PCRF entity accepts the updated routing rule.

7. The TWAG notifies the UE in a WLCP message that the PCRF entity accepts the updated routing rule.

8. The TWAG modifies a related resource.

9. There is a resource setup/release procedure at the 3GPP access side.

Figure 6:
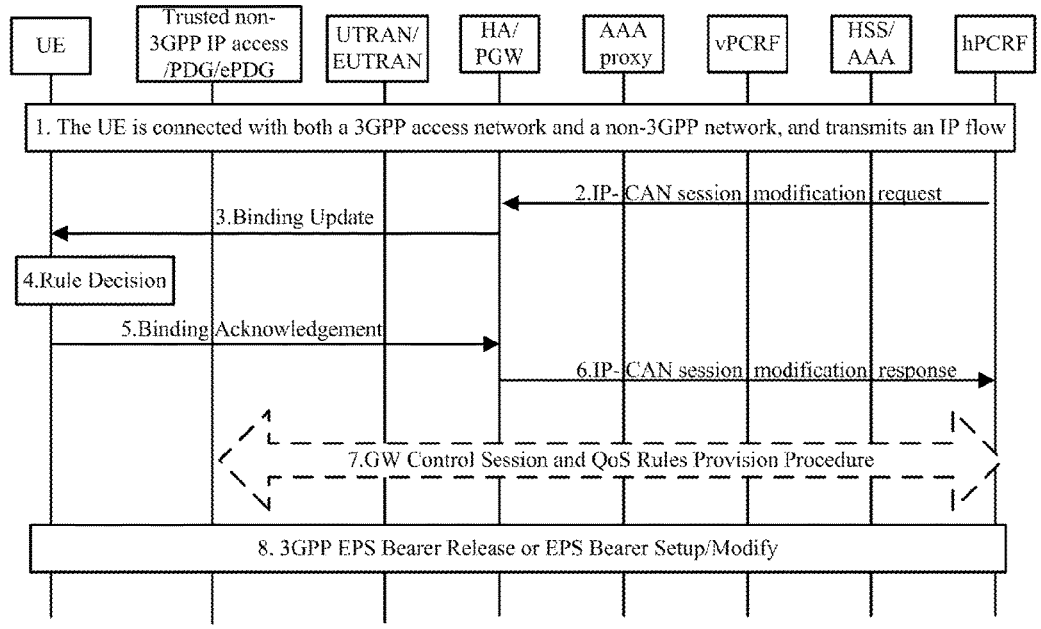
FIG. 6 is a schematic flow chart according to a third embodiment of the invention.

In a third embodiment, this embodiment relates to a network-initiated IFOM procedure including DISMIPv6 based negotiation between a UE and the network side in a particular process as illustrated in FIG. 6 including:

1. The UE is connected with both a 3GPP access network and a non-3GPP network, and transmits an IP flow through the 3GPP access network and the non-3GPP access network under a routing rule.

2. A PCRF entity decides to update the routing rule, according to characteristic information of the IP flow/state information of the access network, and the PCRF entity transmits the updated routing rule to the PGW.

3. The PGPW transmits the updated routing rule to the UE.

4. The UE determines whether the routing rule updated by the PCRF entity is appropriate, according to the state information of the access network/the characteristic information of the IP flow, and an ADNSF strategy. In this embodiment, the UE determines that the updated routing rule is appropriate, and acknowledges the updated routing rule of the PGW.

5 to 6. The UE notifies the network that the UE accepts the updated routing rule.

7 to 8. There are related resource handling procedures at the 3GPP access side and the non-3GPP access side.

Figure 7:
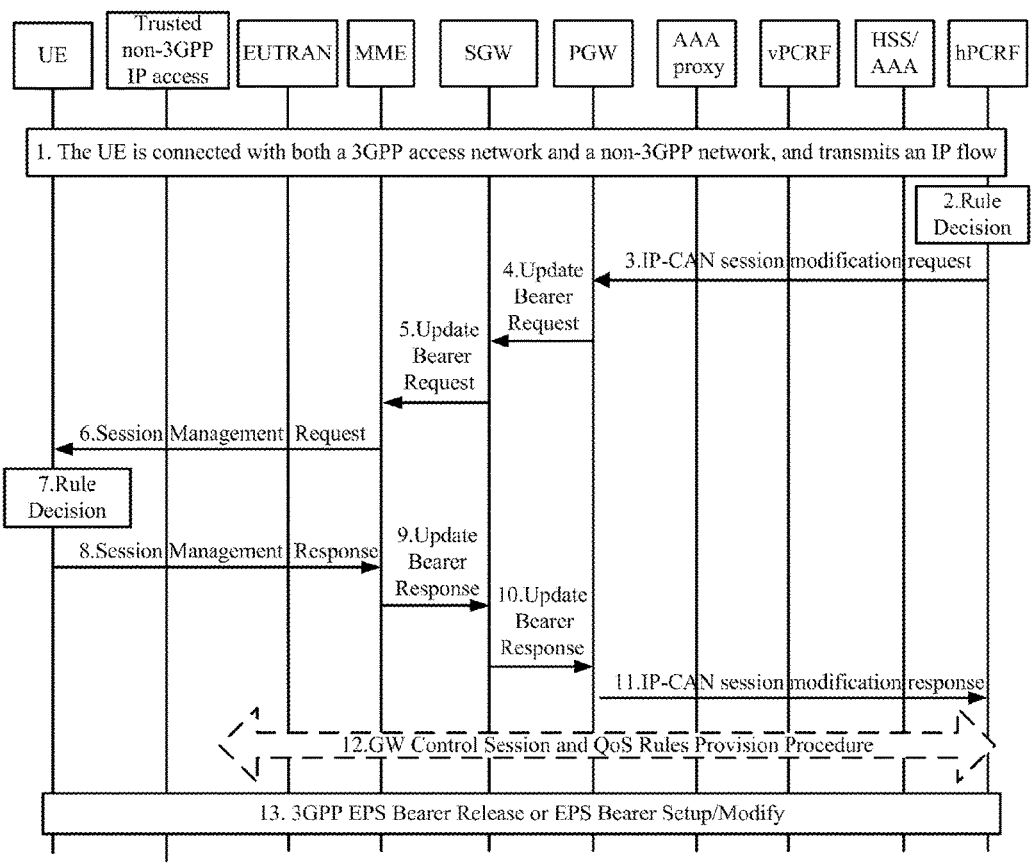
FIG. 7 is a schematic flow chart according to a fourth embodiment of the invention.

In a fourth embodiment, this embodiment relates to a network-initiated IFOM procedure including S2a based negotiation between a UE and the network side in a particular process as illustrated in FIG. 7 including:

1. The UE is connected with both a 3GPP access network and a non-3GPP network, and transmits an IP flow through the 3GPP access network and the non-3GPP access network under a routing rule.

2. A PCRF entity decides to update the routing rule, according to characteristic information of the IP flow/state information of the access network.

3 to 6. The PCRF entity transmits the updated routing rule, and the characteristic information of the IP flow/the state information of the access network to a PGW, and the PGW transmits the updated routing rule and the information to the UE through an SGW and an MME.

7. The UE determines whether the routing rule updated by the PCRF entity is appropriate, according to the characteristic information of the IP flow/the state information of the access network, and an ADNSF strategy. In this embodiment, the UE accepts the updated routing rule.

8 to 11. The UE notifies the network that the UE accepts the updated routing rule.

12 to 13. There are a resource setup/release procedure at the 3GPP access side and the non-3GPP access side.

Figure 8:
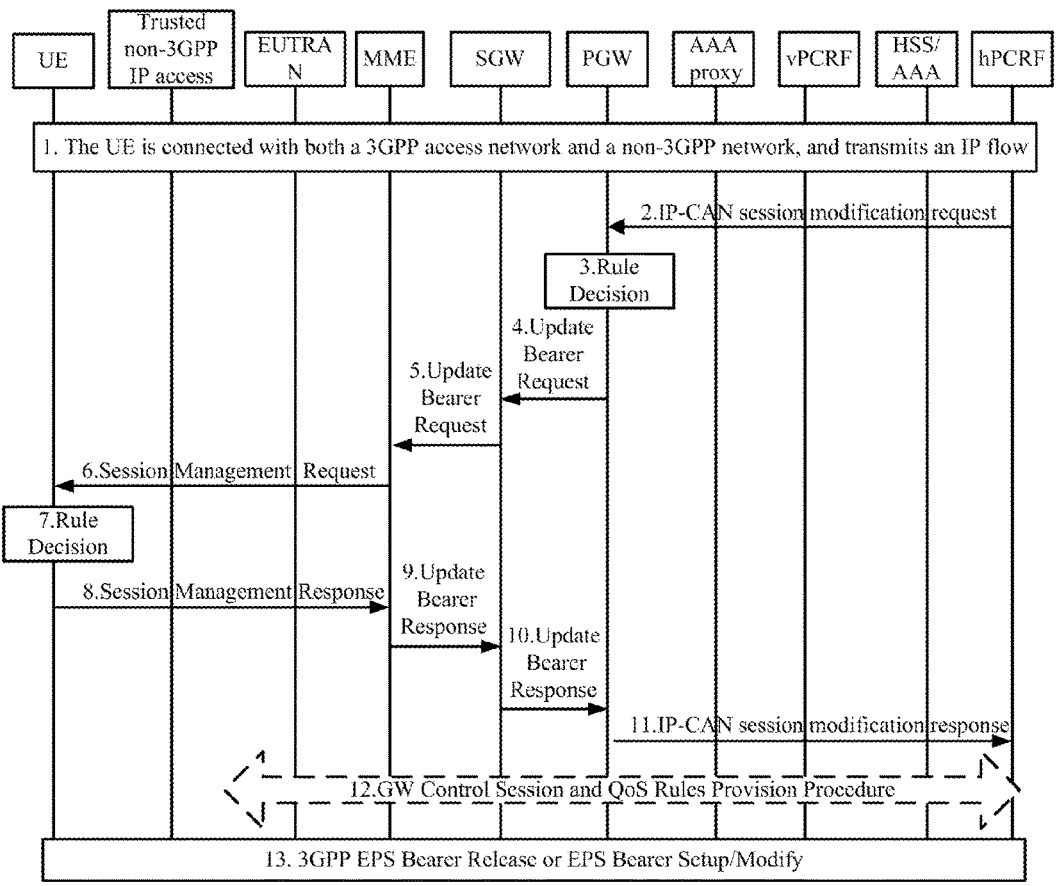
FIG. 8 is a schematic flow chart according to a fifth embodiment of the invention.

In a fifth embodiment, this embodiment relates to a network-initiated IFOM procedure including S2a based negotiation between a UE and the network side in a particular process as illustrated in FIG. 8 including:

1. The UE is connected with both a 3GPP access network and a non-3GPP network, and transmits an IP flow through the 3GPP access network and the non-3GPP access network under a routing rule.

2. A PCRF entity provides a PGW with characteristic information of the IP flow/a state of the access network.

3 to 6. The PGW updates the routing rule according to the characteristic information of the IP flow/the state of the access network, and transmits the updated routing rule to the UE through an SGW and an MME.

7. The UE determines whether the routing rule updated by the PCRF entity is appropriate, according to the characteristic information of the IP flow/the state of the access network, and an ADNSF strategy. In this embodiment, the UE accepts the updated routing rule.

8 to 11. The UE notifies the network that the UE accepts the updated routing rule.

12 to 13. There are a resource setup/release procedure at the 3GPP access side and the non-3GPP access side.

The processing flows of the methods above can be performed in software program, which can be stored in a storage medium, and which can perform the operations of the methods above upon being invoked.

Figure 9:
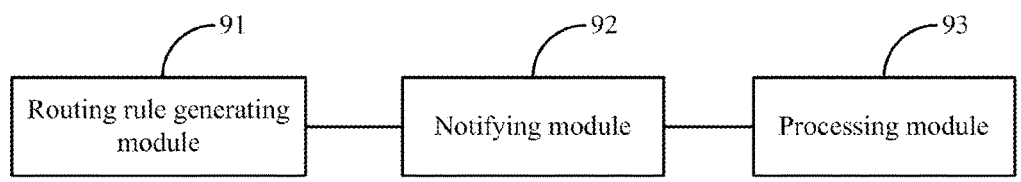
FIG. 9 is a schematic diagram of a communication device according to an embodiment of the invention.

Based upon the same inventive idea, an embodiment of the invention provides a communication device as illustrated in FIG. 9 including:

A routing rule generating module 91 is configured to generate in initiating an IFOM procedure a first routing rule different from a routing rule currently enforced by a second communication device for the second communication device;

A notifying module 92 is configured to notify the second communication device of the first routing rule to request the second communication device for enforcing the first routing rule; and A processing module 93 is configured to determine a routing rule executed by the second communication device as a result according to a message returned by the second communication device.

In an embodiment of the invention, the communication device is a UE, and the second communication device is a network device; or the communication device is a network device, and the second communication device is a UE.

Preferably the network device is a PGW anchored by a PDN connection of the UE, or the network device includes a PGW and a PCRF entity anchored by a PDN connection of the UE.

Two application scenarios where the communication device is a UE, and the second communication device is a network device; and where the communication device is a network device, and the second communication device is a UE will be described below in details respectively.

In a first application scenario, the communication device is a UE, and the second communication device is a network device.

In this scenario, in a first preferred implementation, the processing module 93 is configured:

To determine that the routing rule enforced by the second communication device as a result is the first routing rule upon reception of a first message returned by the second communication device to notify the communication device that the second communication device accepts the first routing rule.

In this scenario, in a second preferred implementation, the processing module 93 is configured:

To receive a second message returned by the second communication device to notify the communication device that the second communication device does not accept the first routing rule, where the second message carries state information of the current network and/or characteristic information of an IP flow; to generate a second routing rule different from the first routing rule for the second communication device according to the information carried in the second message; to notify the second communication device of the second routing rule to request the second communication device for enforcing the second routing rule; and to receive a third message returned by the second communication device to notify the communication device that the second communication device accepts the second routing rule, and to determine that the routing rule enforced by the second communication device as a result is the second routing rule.

In this implementation, the processing module 93 configured to generate the second routing rule for the second communication device according to the information carried in the second message is configured:

To generate the second routing rule for the second communication device according to at least one of an Access Network Discovery and Selection Function (ANDSF) policy, a user preference, and local operating environment information, and the information carried in the second message.

In a second application scenario, the communication device is a network device, and the second communication device is a UE.

In this scenario, the routing rule generating module 91 is configured:

To generate in initiating the IFOM procedure the first routing rule for the second communication device according to state information of the current network, and/or characteristic information of an IP flow.

In this scenario, the notifying module 92 is configured:

To notify the second communication device of the first routing rule, and state information of the current network, and/or characteristic information of an IP flow.

In this scenario, in a first preferred implementation, the processing module 93 is configured:

To determine that the routing rule enforced by the second communication device as a result is the first routing rule upon reception of a first message returned by the second communication device to notify the communication device that the second communication device accepts the first routing rule.

In this scenario, in a second preferred implementation, the processing module 93 is configured:

To receive a fourth message returned by the second communication device to notify the communication device that the second communication device does not accept the first routing rule, where the fourth message carries a third routing rule generated by the second communication device; and to determine that the routing rule enforced by the second communication device as a result is the third routing rule;

Where the third routing rule is generated by the second communication device according to state information of the current network, and/or characteristic information of an IP flow, and at least one of an ANDSF policy, a user preference, and local operating environment information.

Further to any one of the embodiments above, in order to support negotiation between the communication device and the second communication device, the ANDSF policy is further extended in an embodiment of the invention as follows:

The ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or A routing rule in the ANDSF policy includes a condition to be satisfied by an IP flow to be transmitted over the current network.

Preferably the condition to be satisfied by an IP flow to be transmitted over the current network includes at least one of a congestion extent of the network to be satisfied, an IP flow delay to be satisfied, and a jitter characteristic to be satisfied.

Figure 10:
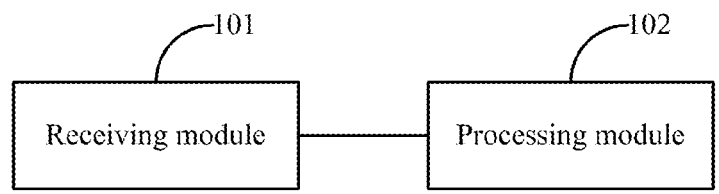
FIG. 10 is a schematic diagram of another communication device according to an embodiment of the invention.

Based upon the same inventive idea, an embodiment of the invention further provides a communication device as illustrated in FIG. 10 including:

A receiving module 101 is configured to receive a first routing rule notified by a first communication device, which is different from a routing rule currently enforced by the communication device; and A processing module 102 is configured to decide whether to accept the first routing rule, according to a preset condition, and to return different messages to the first communication device according to respective decision results.

In an embodiment of the invention, the first communication device is a UE, and the communication device is a network device; or the first communication device is a network device, and the communication device is a UE.

Preferably the network device is a PGW anchored by a PDN connection of the UE, or the network device includes a PGW and a PCRF entity anchored by a PDN connection of the UE.

Two application scenarios where the first communication device is a UE, and the communication device is a network device; and where the first communication device is a network device, and the communication device is a UE will be described below in details respectively.

In a first application scenario, the communication device is a network device, and the first communication device is a UE.

In this scenario, the processing module 102 is configured:

To decide whether to accept the first routing rule, according to state information of the current network, and/or characteristic information of an IP flow;

To return a first message to the first communication device to notify the first communication device that the communication device accepts the first routing rule, and to enforce the first routing rule, upon deciding to accept the first routing rule; and To return a second message to the first communication device to notify the first communication device that the communication device does not accept the first routing rule, where the second message carries the state information of the current network, and/or the characteristic information of the IP flow, upon deciding not to accept the first routing rule.

In this scenario, the receiving module 101 is further configured:

To receive a second routing rule notified by the first communication device, and to enforce the second routing rule, where the second routing rule is generated by the first communication device according to the information carried in the second message.

In a second application scenario, the communication device is a UE, and the first communication device is a network device.

In this scenario, the processing module 102 is configured:

To decide whether to accept the first routing rule according to state information of the current network, and/or characteristic information of an IP flow;

To return a first message to the first communication device to notify the first communication device that the communication device accepts the first routing rule, and to enforce the first routing rule, upon deciding to accept the first routing rule; and To generate a third routing rule for the communication device according to the state information of the current network, and/or the characteristic information of the IP flow, to enforce the third routing rule, and to return a third message to the first communication device to notify the first communication device that the communication device does not accept the first routing rule, where the third message carries the third routing rule, upon deciding not to accept the first routing rule.

Furthermore the processing module 102 configured to generate the third routing rule for the communication device according to the state information of the current network, and/or the characteristic information of the IP flow is configured:

To generate the third routing rule for the communication device according to at least one of an ANDSF policy, a user preference, and local operating environment information, and the state information of the current network, and/or the characteristic information of the IP flow.

Further to any one of the embodiments above, in order to support negotiation between the first communication device and the communication device, the ANDSF policy is further extended in an embodiment of the invention as follows:

The ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or A routing rule in the ANDSF policy includes a condition to be satisfied by an IP flow to be transmitted over the current network.

Preferably the condition to be satisfied by an IP flow to be transmitted over the current network includes at least one of a congestion extent of the network to be satisfied, an IP flow delay to be satisfied, and a jitter characteristic to be satisfied.

Structures of and processing by a UE and a network device according to embodiments of the invention will be described below in connection with their preferred hardware structures.

Figure 11:
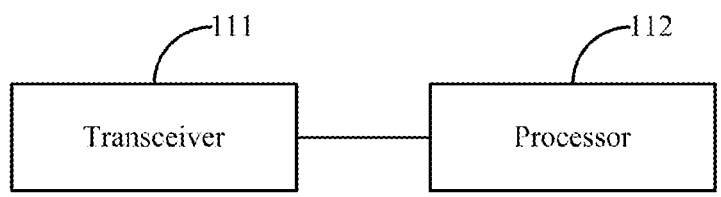
FIG. 11 is a schematic diagram of a UE according to an embodiment of the invention.

As illustrated in FIG. 11, the UE includes a transceiver 111, and at least one processor 112 connected with the transceiver 111, where:

I. For a UE-initiated IFOM procedure:

The processor 112 is configured to generate in initiating an IFOM procedure a first routing rule different from a routing rule currently enforced by a network device; and to determine a routing rule executed by the network device as a result according to a message returned by the network device; and The transceiver 111 is configured to notify the second communication device of the first routing rule generated by the processor 112 to request the second communication device for enforcing the first routing rule; and to receive a message returned by the network device.

Furthermore in a first preferred implementation, the processor 112 is configured:

To determine that the routing rule enforced by the second communication device as a result is the first routing rule after the transceiver 111 receives a first message returned by the second communication device to notify the first communication device that the second communication device accepts the first routing rule.

In this scenario, in a second preferred implementation, the processor 112 is configured, after the transceiver 111 receives a second message returned by the second communication device to notify the first communication device that the second communication device does not accept the first routing rule, where the second message carries state information of the current network and/or characteristic information of an IP flow, to generate a second routing rule different from the first routing rule for the second communication device according to the information carried in the second message; and The transceiver 111 is configured to notify the second communication device of the second routing rule to request the second communication device for enforcing the second routing rule;

in this implementation, the transceiver 11 is further configured, after notifying the second communication device of the second routing rule, to receive a third message returned by the second communication device to notify the first communication device that the second communication device accepts the second routing rule; and The processor 112 is further configured to determine that the routing rule enforced by the second communication device as a result is the second routing rule.

In this implementation, the processor 112 configured to generate the second routing rule for the second communication device according to the information carried in the second message is configured:

To generate the second routing rule for the second communication device according to at least one of an Access Network Discovery and Selection Function (ANDSF) policy, a user preference, and local operating environment information, and the information carried in the second message.

II. For a network-initiated IFOM procedure:

The processor 112 is configured:

To decide whether to accept a first routing rule, according to state information of the current network, and/or characteristic information of an IP flow;

To enforce the first routing rule, and to trigger the transceiver 111 to return a first message to the first communication device to notify the first communication device that the second communication device accepts the first routing rule, upon deciding to accept the first routing rule; and To generate a third routing rule for the UE served by the network device according to the state information of the current network, and/or the characteristic information of the IP flow, to execute the third routing rule, and to trigger the transceiver 111 to return a third message to the first communication device to notify the first communication device that the second communication device does not accept the first routing rule, where the third message carries the third routing rule, upon deciding not to accept the first routing rule.

Furthermore the processor 112 to generate the third routing rule for the UE served by the network device according to the state information of the current network, and/or the characteristic information of the IP flow is configured:

To generate the third routing rule for the communication device according to at least one of an ANDSF policy, a user preference, and local operating environment information, and the state information of the current network, and/or the characteristic information of the IP flow.

Further to any one of the embodiments above, in order to support negotiation between the UE and the network device, the ANDSF policy is further extended in an embodiment of the invention as follows:

The ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or A routing rule in the ANDSF policy includes a condition to be satisfied by an IP flow to be transmitted over the current network.

Preferably the condition to be satisfied by an IP flow to be transmitted over the current network includes at least one of a congestion extent of the network to be satisfied, an IP flow delay to be satisfied, and a jitter characteristic to be satisfied.

Figure 12:
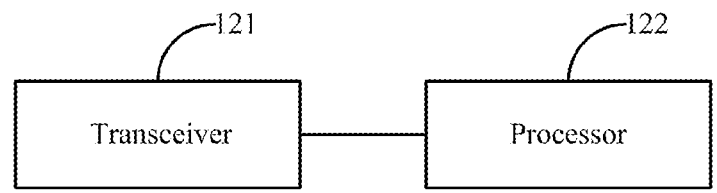
FIG. 12 is a schematic diagram of a network side device according to an embodiment of the invention.

As illustrated in FIG. 12, the network device includes a transceiver 121, and at least one processor 122 connected with the transceiver 121, where:

I. For a UE-initiated IFOM procedure:

The processor 122 is configured:

To decide whether to accept a first routing rule, according to state information of the current network, and/or characteristic information of an IP flow;

To enforce the first routing rule, and to trigger the transceiver 121 to return a first message to the first communication device to notify the first communication device that the second communication device accepts the first routing rule, upon deciding to accept the first routing rule; and To trigger the transceiver 121 to return a second message to the first communication device to notify the first communication device that the second communication device does not accept the first routing rule, where the second message carries the state information of the current network, and/or the characteristic information of the IP flow, upon deciding not to accept the first routing rule.

In this scenario, the transceiver 121 is further configured to receive a second routing rule notified by the first communication device, where the second routing rule is generated by the first communication device according to the information carried in the second message; and The processor 122 is further configured to enforce the second routing rule.

II. For a network-initiated IFOM procedure:

The processor 122 is configured to generate in initiating an IFOM procedure a first routing rule different from a routing rule currently enforced by a second communication device for the second communication device; and to determine a routing rule executed by the second communication device as a result according to a message returned by the second communication device; and The transceiver 121 is configured to notify the second communication device of the first routing rule to request the second communication device for enforcing the first routing rule.

In an implementation, the processor 122 is configured to generate in initiating the IFOM procedure the first routing rule for the second communication device according to state information of the current network, and/or characteristic information of an IP flow.

In an implementation, the transceiver 121 is configured to notify the second communication device of the first routing rule, and state information of the current network, and/or characteristic information of an IP flow.

In this scenario, in a first preferred implementation, the processor 122 is configured:

To determine that the routing rule enforced by the second communication device as a result is the first routing rule after the transceiver 121 receives a first message returned by the second communication device to notify the first communication device that the second communication device accepts the first routing rule.

In this scenario, in a second preferred implementation, the transceiver 121 is configured to receive a fourth message returned by the second communication device to notify the first communication device that the second communication device does not accept the first routing rule, where the fourth message carries a third routing rule generated by the second communication device; and The processor 122 is configured to determine that the routing rule enforced by the second communication device as a result is the third routing rule;

Where the third routing rule is generated by the second communication device according to state information of the current network, and/or characteristic information of an IP flow, and at least one of an ANDSF policy, a user preference, and local operating environment information.

Further to any one of the embodiments above, in order to support negotiation between the UE and the network device, the ANDSF policy is further extended in an embodiment of the invention as follows:

The ANDSF policy includes a routing rule indicating an uplink access technology and/or access network for routing an uplink IP flow of the UE side satisfying a preset IP traffic filter, and a routing rule indicating a downlink access technology and/or access network for routing a downlink IP flow of the Packet Data Network Gateway (PGW) side satisfying a preset IP traffic filter; and/or A routing rule in the ANDSF policy includes a condition to be satisfied by an IP flow to be transmitted over the current network.

Preferably the condition to be satisfied by an IP flow to be transmitted over the current network includes at least one of a congestion extent of the network to be satisfied, an IP flow delay to be satisfied, and a jitter characteristic to be satisfied.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining an IP flow routing rule, the method comprising:

generating, by a first communication device in initiating an Internet Protocol Flow Mobility (IFOM) procedure, a first routing rule different from a routing rule currently enforced by a second communication device for the second communication device;

notifying, by the first communication device, the second communication device of the first routing rule to request the second communication device for enforcing the first routing rule; and determining, by the first communication device, a routing rule executed by the second communication device as a result according to a message returned by the second communication device;

wherein when the first communication device is a User Equipment (UE), and the second communication device is a network device, determining, by the first communication device, the routing rule executed by the second communication device as a result according to the message returned by the second communication device comprises:

receiving, by the first communication device, a first message returned by the second communication device to notify the first communication device that the second communication device does not accept the first routing rule, wherein the first message carries state information of the current network and/or characteristic information of an IP flow; generating, by the first communication device, a second routing rule for the second communication device according to at least one of an Access Network Discovery and Selection Function (ANDSF) policy, a user preference, and local operating environment information, and the information carried in the first message; notifying, by the first communication device, the second communication device of the second routing rule to request the second communication device for enforcing the second routing rule: and receiving, by the first communication device, a second message returned by the second communication device to notify the first communication device that the second communication device accepts the second routing rule, and determining that the routing rule enforced by the second communication device as a result is the second routing rule;

or wherein when the first communication device is the network device, and the second communication device is the UE, determining, by the first communication device, the routing rule executed by the second communication device as a result according to the message returned by the second communication device comprises:

receiving, by the first communication device, a third message returned by the second communication device to notify the first communication device that the second communication device does not accept the first routing rule, wherein the third message carries a third routing rule generated by the second communication device; and determining, by the first communication device, that the routing rule enforced by the second communication device as a result is the third routing rule;

wherein the third routing rule is generated by the second communication device according to state information of the current network, and/or characteristic information of an IP flow, and at least one of an ANDSF policy, a user preference, and local operating environment information.

2. The method according to claim 1, wherein determining, by the first communication device, the routing rule executed by the second communication device as a result according to the message returned by the second communication device comprises:

determining, by the first communication device, that the routing rule enforced by the second communication device as a result is the first routing rule upon reception of a fourth message returned by the second communication device to notify the first communication device that the second communication device accepts the first routing rule.

3. The method according to claim 1, wherein generating, by the first communication device in initiating the IFOM procedure, the first routing rule different from the routing rule currently enforced by the second communication device for the second communication device comprises:

generating, by the first communication device in initiating the IFOM procedure, the first routing rule for the second communication device according to state information of the current network, and/or characteristic information of an IP flow.

4. The method according to claim 1, wherein notifying, by the first communication device, the second communication device of the first routing rule comprises:

notifying, by the first communication device, the second communication device of the first routing rule, and state information of the current network, and/or characteristic information of an IP flow.

5. A method for determining an IP flow routing rule, the method comprising:

receiving, by a second communication device, a first routing rule notified by a first communication device, which is different from a routing rule currently enforced by the second communication device;

deciding, by the second communication device, whether to accept the first routing rule, according to a preset condition; and returning, by the second communication device, different messages to the first communication device according to respective decision results;

wherein deciding, by the second communication device, whether to accept the first routing rule, according to the preset condition, and returning the different messages to the first communication device according to the respective decision results comprises:

deciding, by the second communication device, whether to accept the first routing rule, according to state information of the current network, and/or characteristic information of an IP flow;

when the first communication device is a User Equipment (UE), and the second communication device is a network device, returning, by the second communication device, a first message to the first communication device to notify the first communication device that the second communication device does not accept the first routing rule, wherein the first message carries the state information of the current network, and/or the characteristic information of the IP flow, upon deciding not to accept the first routing rule; receiving, by the second communication device, a second routing rule notified by the first communication device, and enforcing the second routing rule, wherein the second routing rule is generated by the first communication device according to at least one of an Access Network Discovery and Selection Function (ANDSF) policy, a user preference, and local operating environment information, and the information carried in the first message, or when the first communication device is the network device, and the second communication device is the UE, generating, by the second communication device, a third routing rule for the second communication device according to at least one of an ANDSF policy, a user preference, and local operating environment information, and the state information of the current network, and/or the characteristic information of the IP flow: enforcing the third routing rule, and returning a second message to the first communication device to notify the first communication device that the second communication device does not accept the first routing rule, wherein the second message carries the third routing rule, upon deciding not to accept the first routing rule.

6. The method according to claim 5, wherein deciding, by the second communication device, whether to accept the first routing rule, according to the preset condition, and returning the different messages to the first communication device according to the respective decision results comprises:
returning, by the second communication device, a third message to the first communication device to notify the first communication device that the second communication device accepts the first routing rule, and enforcing the first routing rule, upon deciding to accept the first routing rule.

7. A user equipment, comprising a transceiver, and at least one processor connected with the transceiver, wherein:
the processor is configured to generate in initiating an IFOM procedure a first routing rule different from a routing rule currently enforced by a network device, and to determine a routing rule executed by the network device as a result according to a message returned by the network device; and the transceiver is configured to notify the network device of the first routing rule generated by the processor to request the network device for enforcing the first routing rule, and to receive the message returned by the network device;
wherein the processor is further configured, after the transceiver receives a first message returned by the network device to notify the user equipment that the network device does not accept the first routing rule, wherein the first message carries state information of the current network and/or characteristic information of an IP flow, to generate a second routing rule different from the first routing rule for the network device according to at least one of an Access Network Discovery and Selection Function (ANDSF) policy, a user preference, and local operating environment information, and the information carried in the first message:
the transceiver is further configured to notify the network device of the second routing rule to request the network device for enforcing the second routing rule: to receive a second message returned by the network device to notify the user equipment that the network device accepts the second routing rule: and the processor is further configured to determine that the routing rule enforced by the network device as a result is the second routing rule;

or the processor is configured to decide whether to accept the first routing rule, according to state information of the current network, and/or characteristic information of an IP flow, and to enforce the first routing rule, and to trigger the transceiver to return a third message to the network device to notify the network device that the user equipment accepts the first routing rule, upon deciding to accept the first routing rule; and to generate a third routing rule for the user equipment according to at least one of an ANDSF policy, a user preference, and local operating environment information, and the state information of the current network, and/or the characteristic information of the IP flow; to execute the third routing rule, and to trigger the transceiver to return a fourth message to the network device to notify the network device that the user equipment does not accept the first routing rule, wherein the fourth message carries the third routing rule, upon deciding not to accept the first routing rule.

8. The user equipment according to claim 7, wherein the processor is configured:
to determine that the routing rule enforced by the network device as a result is the first routing rule after the transceiver receives a fifth message returned by the network device to notify the user equipment that the network device accepts the first routing rule.

9. A network device, comprising a transceiver, and at least one processor connected with the transceiver, wherein:
the processor is configured to decide whether to accept a first routing rule, according to state information of the current network, and/or characteristic information of an IP flow, to enforce the first routing rule, and to trigger the transceiver to return a first message to a user equipment to notify the user equipment that the network device accepts the first routing rule, upon deciding to accept the first routing rule, and to trigger the transceiver to return a second message to the user equipment to notify the user equipment that the network device does not accept the first routing rule, wherein the second message carries the state information of the current network, and/or the characteristic information of the IP flow, upon deciding not to accept the first routing rule; the transceiver is further configured to receive a second routing rule notified by the user equipment, wherein the second routing rule is generated by the user equipment according to at least one of an Access Network Discovery and Selection Function (ANDSF) policy, a user preference, and local operating environment information, and the information carried in the second message; and the processor is further configured to enforce the second routing rule;

or the processor is configured to generate in initiating an IFOM procedure a first routing rule different from a routing rule currently enforced by a user equipment for the user equipment, and to determine a routing rule executed by the user equipment as a result according to a message returned by the user equipment; and the transceiver is configured to notify the user equipment of the first routing rule to request the user equipment for enforcing the first routing rule;

wherein the transceiver is further configured to receive a third message returned by the user equipment to notify the network device that the user equipment does not accept the first routing rule, wherein the third message carries a third routing rule generated by the user equipment: and the processor is configured to determine that the routing rule enforced by the user equipment as a result is the third routing rule;

wherein the third routing rule is generated by the user equipment according to state information of the current network, and/or characteristic information of an IP flow, and at least one of an ANDSF policy, a user preference, and local operating environment information.

10. The network device according to claim 9, wherein the processor is configured to generate in initiating the IFOM procedure the first routing rule for the user equipment according to state information of the current network, and/or characteristic information of an IP flow; and the transceiver is configured to notify the user equipment of the first routing rule, and the state information of the current network, and/or the characteristic information of the IP flow.

11. The network device according to claim 9, wherein the processor is configured:

to determine that the routing rule enforced by the user equipment as a result is the first routing rule after the transceiver receives a fourth message returned by the user equipment to notify the network device that the user equipment accepts the first routing rule.

* * * * *